US006440761B1

(12) United States Patent
Choi

(10) Patent No.: US 6,440,761 B1
(45) Date of Patent: Aug. 27, 2002

(54) CARBON NANOTUBE FIELD EMISSION ARRAY AND METHOD FOR FABRICATING THE SAME

(75) Inventor: Won-bong Choi, Suwon (KR)

(73) Assignee: Samsung SDI Co., Ltd. (KR)

( * ) Notice: Subject to any disclaimer, the term of this patent is extended or adjusted under 35 U.S.C. 154(b) by 0 days.

(21) Appl. No.: 09/570,403

(22) Filed: May 12, 2000

(30) Foreign Application Priority Data

May 24, 1999 (KR) .............................. 99-18659

(51) Int. Cl.⁷ .............................. H01L 21/00; H01J 1/02
(52) U.S. Cl. .......................................... 438/20; 313/309
(58) Field of Search ............................ 438/20, 21, 39; 445/51, 24; 313/495, 306, 307, 309, 311, 336

(56) References Cited

U.S. PATENT DOCUMENTS

| | | | |
|---|---|---|---|
| 5,773,921 A | * 6/1998 | Keesmann et al. | 313/309 |
| 5,853,877 A | * 12/1998 | Shibuta | 478/357 |
| 5,855,828 A | * 1/1999 | Tuffias et al. | 264/29.1 |
| 5,909,585 A | * 6/1999 | Shibuta | 252/506 |
| 5,948,465 A | * 9/1999 | Blanchet-Fincher et al. | 427/77 |
| 5,973,444 A | * 10/1999 | Xu et al. | 313/309 |
| 6,097,138 A | * 8/2000 | Nakamoto | 313/309 |
| 6,221,154 B1 | * 4/2001 | Lee et al. | 117/87 |
| 6,239,547 B1 | * 5/2001 | Uemura et al. | 313/495 |
| 6,248,248 B1 | * 6/2001 | Silverbrook | 216/27 |
| 6,250,984 B1 | * 6/2001 | Jin et al. | 313/306 |
| 6,299,812 B1 | * 10/2001 | Newman et al. | 264/176.1 |
| 6,315,956 B1 | * 11/2001 | Foulger | 252/511 |

OTHER PUBLICATIONS

Choi, W.B., "L2.1: Late–News Paper: A 4.5 in. Fully Sealed Carbon Nanotube–Based Field–Emission Flat–Panel Display." Society for Information Display, May 1999, pp. 1134–1137.

Wang, Q.H., et al., "A nanotube–based field–emission flat panel display," Applied Physics Letters, vol. 72, No. 22, Jun. 1, 1998, pp. 2912–2913.

* cited by examiner

Primary Examiner—Wael Fahmy
Assistant Examiner—Brook Kebede
(74) Attorney, Agent, or Firm—Burns, Doane, Swecker & Mathis, LLP

(57) ABSTRACT

A field emission array (FEA) using carbon nanotubes having characteristics of low work function, durability and thermal stability, and a method for fabricating the same are provided. The field emission array uses carbon nanotubes as electron emission sources, thereby lowering a work function and dropping driving voltage. Accordingly, a device can be driven at low voltage. In addition, resistance to gases, which are generated during the operation of a device, is improved, thereby increasing the life span of an emitter. The method prints a mixed paste using extrusion or screen printing and performs sintering, thereby fusing carbon nanotubes such that the carbon nanotubes are aligned in a single direction.

18 Claims, 11 Drawing Sheets

(a)

(b)

(c)

(d)

CARBON NANOTUBE FIELD EMISSION ARRAY AND METHOD FOR FABRICATING THE SAME

The following is based on Korean Patent Application 99-18659 filed in the Republic of Korea on May 24, 1999, herein incorporated by reference.

BACKGROUND OF THE INVENTION

1. Field of the Invention

The present invention relates to a field emission array (FEA) using carbon nanotubes having characteristics of low work function, durability and thermal stability, and a method for fabricating the same.

2. Description of the Related Art

Carbon nanotubes, which were developed in 1991, are similar to fulleren ($C_6O$). Since they have an excellent electron emission characteristic and chemical and mechanical durability, their physical properties and applications have steadily been studied.

A Spind't-type field emission emitter, which is generally used for field emission displays, is composed of an emitter for emitting electrons and a gate for facilitating the emission of electrons. The emitter has a problem in that the life span of a tip is shortened due to atmosphere gases or a non-uniform electric field during operation. In addition, with such conventional metal emitter, a work function must be decreased to decrease the driving voltage, but there are limitations. To overcome this problem, fabrication of an electron emission source using carbon nanotubes which have a substantially high aspect ratio, an excellent durability due to their structure similar to that of $C_6O$, and an excellent electron conductivity has been studied.

FIG. 1 is a schematic exploded perspective view of a field emission device using conventional carbon nanotubes which are disclosed in Appl. Phys. Lett., Vol. 72, No. 22, Jun. 1, 1998. As shown in FIG. 1, the field emission device using the conventional carbon nanotubes includes a front substrate 1 and a rear substrate 11 facing each other and anodes 2 and cathodes 12 which are formed on the front and rear substrates 1 and 11, respectively, in a striped pattern such that the anodes 2 cross the cathodes 12. The cathodes 12 are formed of carbon nanotubes in a structure in which grooves are formed on the rear substrate 11 in a striped pattern and the grooves are filled with a carbon nanotube-epoxy mixture. The anodes 2 are formed of an ITO film coated with phosphors.

FIG. 2A shows the steps of a method of fabricating the cathodes 12 on the rear substrate 11 of the field emission device of FIG. 1 using carbon nanotubes. FIG. 2B shows the steps of a method of fabricating the anodes 2 on the front substrate 1 of the field emission device of FIG. 1 using carbon nanotubes.

In fabricating the cathodes 12 using carbon nanotubes, grooves 12a, as shown in (b) of FIG. 2A, are formed in a striped pattern on a glass substrate 11', as shown in (a) of FIG. 2A. Next, a carbon nanotube-epoxy mixture 12' is deposited, as shown in (c) of FIG. 2A. Finally, the surface of the resulting structure is planarized to complete the cathodes 12, as shown in (d) of FIG. 2A.

In fabricating the anodes 2, an ITO film 2' is deposited on the glass substrate 1, as shown in (a) of FIG. 2B. Next, as shown in (b) of FIG. 2B, the ITO film 2' is etched in a striped pattern to form the anodes 2. As shown in (c) of FIG. 2B, the anodes 2 are coated with phosphors 3.

In fabricating cathodes using carbon nanotubes in such way, however, it is very difficult to align the carbon nanotubes in a single direction and to connect the carbon nanotubes to electrodes when manufacturing a device. Accordingly, this alignment problem must be overcome to substantially apply carbon nanotubes to a display device.

SUMMARY OF THE INVENTION

To solve the above problem, an object of the present invention is to provide a field emission array using carbon nanotubes, which can be easily aligned and closely contacts cathodes, and a method for fabricating the same.

To achieve the above object, the present invention provides a field emission array using carbon nanotubes. The field emission array includes front and rear substrates facing each other and separated by a predetermined distance; anodes and cathodes formed on the front and rear substrates facing each other, respectively, in a striped pattern, the anodes and the cathodes crossing each other; carbon nanotubes fixed on the cathodes corresponding to intersections between the cathodes and the anodes; and a metal fuser element for fixing the carbon nanotubes on the cathodes and conducting currents between the cathodes and the carbon nanotubes.

Preferably, the field emission array also includes an insulating layer deposited on the cathodes around the carbon nanotubes and the rear substrate, and gates formed on the insulating layer in a striped pattern to be parallel to the anodes. Each of the anodes is formed of an ITO film and coated with phosphor.

To achieve the above object, the present invention also provides a method of fabricating a field emission array using carbon nanotubes. The method includes the steps of: (a) forming cathodes on a rear substrate in a striped pattern; (b) printing a mixture of carbon nanotubes, metal powder and organic binder on predetermined areas of the cathodes; (c) vaporizing the organic binder by sintering the mixture and anchoring the carbon nanotubes on the cathodes by diffusing the metal powder; and (d) combining a front substrate, on which anodes are formed in a striped pattern, with the rear substrate having the cathodes on which the carbon nanotubes are anchored.

Preferably, the method also includes the steps of: forming an insulating layer on the tops of the cathodes other than portions to which the carbon nanotubes are to be adhered and on the top of the exposed rear substrate, before the step (b); and forming gates on the insulating layer after the step (c). At this time, the metal powder is composed of metal particles of a metal, selected from the group consisting of Ag, Al, Ni, Cu and Zn, having a diameter of 0.1–10 μm and is diffused at a temperature of 250–500° C.

Preferably, in the step (b), the metal powder is melted at a low temperature of 100–350° C., and in the step (c), the mixture is sintered to evaporate the organic binder, and the low melting point metal powder is melted to anchor the carbon nanotubes on the cathodes. The metal powder is preferably composed of particles of a metal selected from the group consisting of Pb, In, InSn, PbSn, AuSn and a metal alloy thereof.

In the step (b), the organic binder is composed of at least one selected from the group consisting of α-terpineol, ethyl cellulose and butyl carbitol acetate, and the printing is performed by an extrusion method using a filter for aligning the carbon nanotubes. Alternatively, in the step (b), the printing is performed by a screen printing method using a metal mesh screen which is patterned for aligning the carbon nanotubes. Preferably, in the step (c), the sintering is performed at a temperature of 200–500° C.

BRIEF DESCRIPTION OF THE DRAWINGS

The above object and advantages of the present invention will become more apparent by describing in detail preferred embodiments thereof with reference to the attached drawings in which:

FIG. 7A is a sectional view illustrating a step of putting a screen printer on a rear substrate having cathodes and performing printing;

FIG. 7B is a plan view of the mesh screen woven with stainless wires in the screen printer;

FIG. 7C is an enlarged view of the mesh structure of part A of FIG. 7B;

FIG. 7D is a sectional view of FIG. 7C taken along the line B–B';

FIG. 7E is a sectional view of the structure of a completed rear substrate on which carbon nanotubes are metal fused to cathodes by firing and gates are formed on an insulating layer, after finishing the printing shown in FIGS. 7A through 7D;

DETAILED DESCRIPTION OF THE INVENTION

Figure 1:
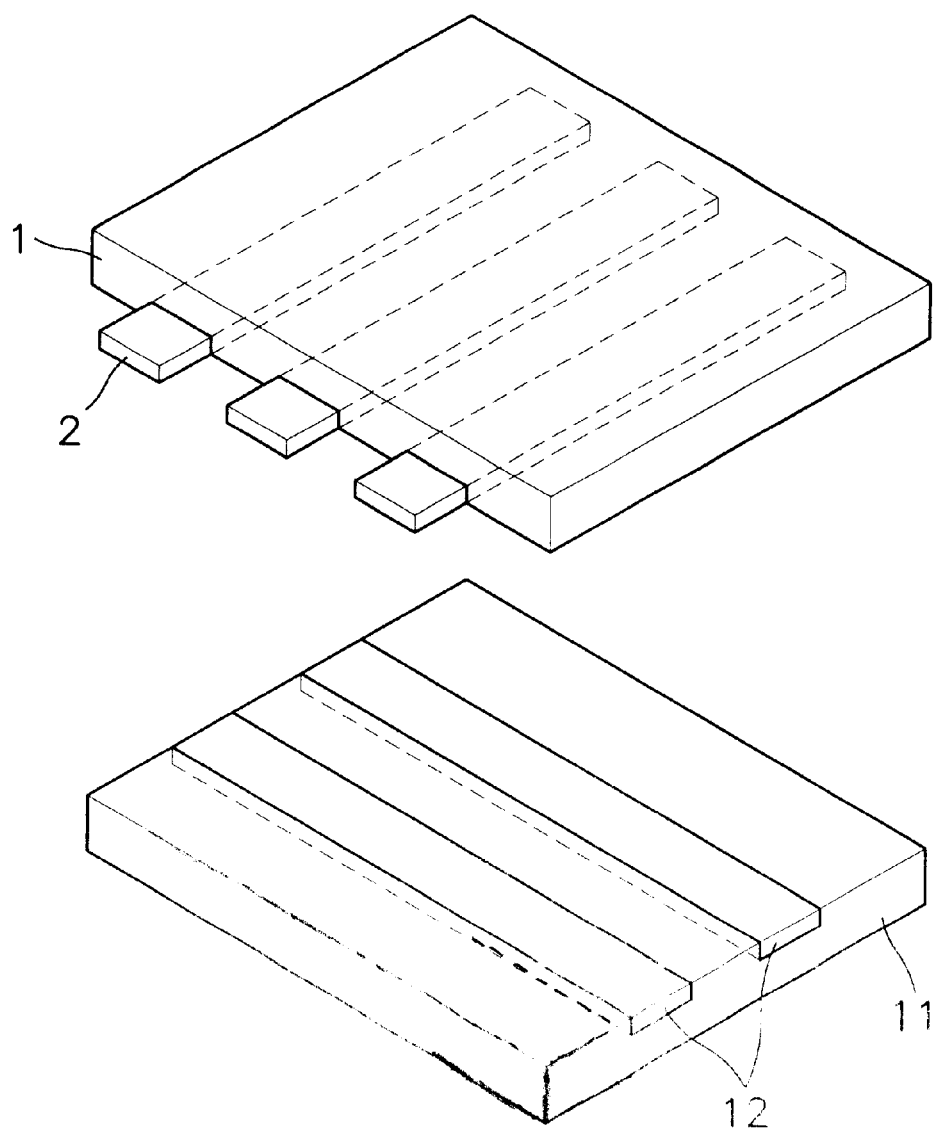
FIG. 1 is a schematic exploded perspective view of a field emission device using conventional carbon nanotubes.
Figure 2A:
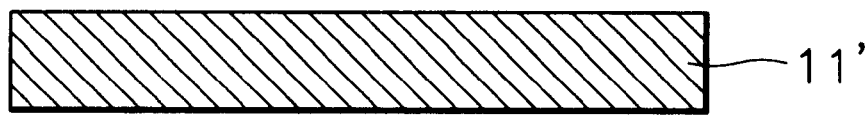
FIG. 2A shows the steps of a method of fabricating cathodes on a rear substrate of the carbon nanotube field emission device of FIG. 1.
Figure 2A:
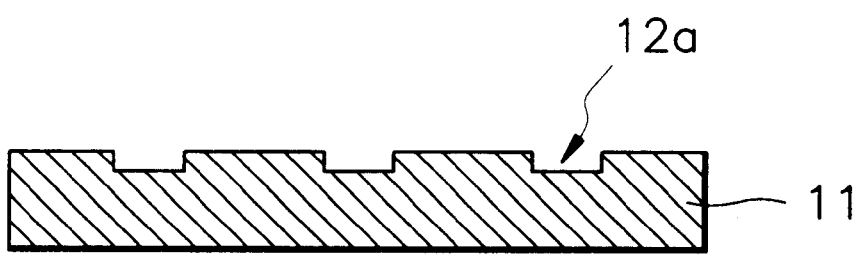
Figure 2A:
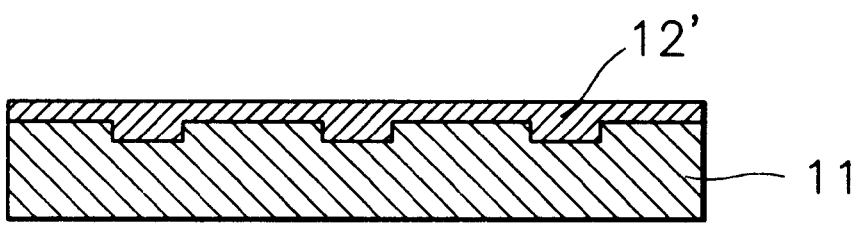
Figure 2A:
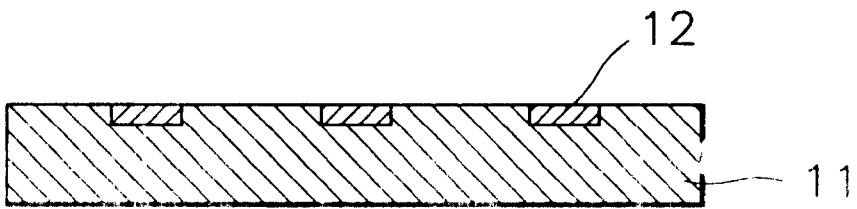
Figure 2B:
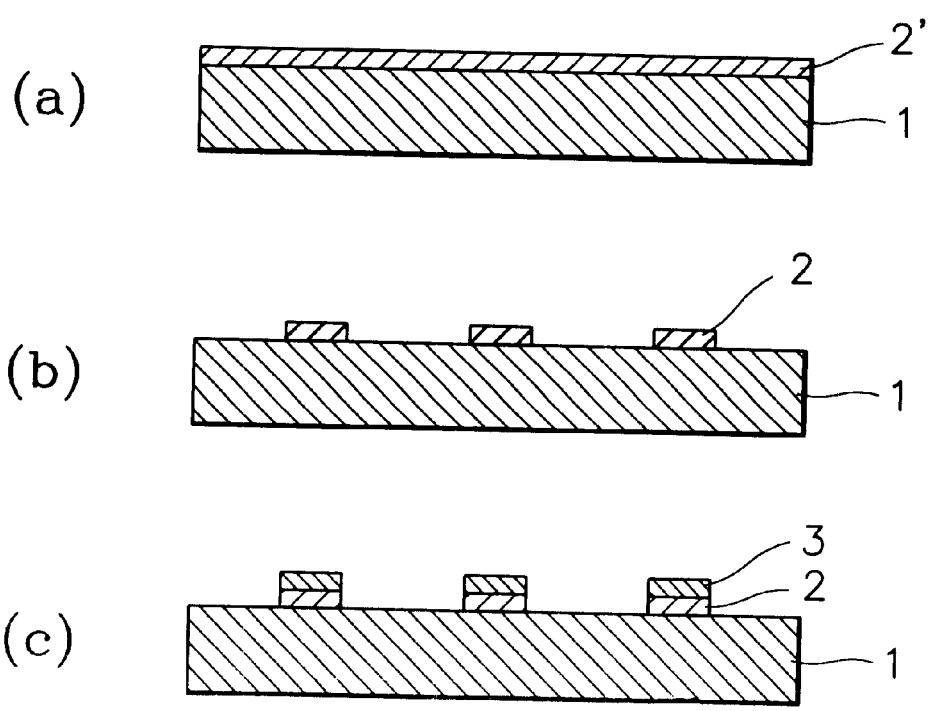
FIG. 2B shows the steps of a method of fabricating anodes on a front substrate of the carbon nanotube field emission device of FIG. 1.
Figure 3A:
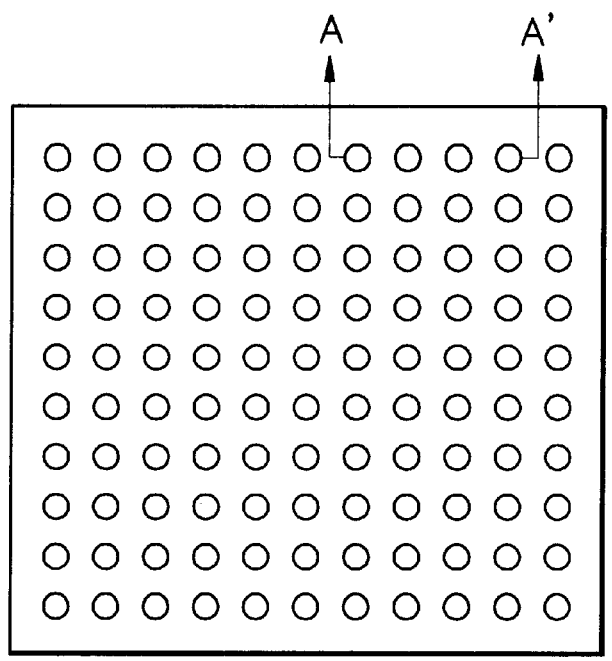
FIG. 3A is a plan view of a field emission array using carbon nanotubes according to the present invention.

A field emission array using carbon nanotubes according to the present invention is characterized in that carbon nanotubes and metal power are adhered to cathodes with an organic matter, and then the carbon nanotubes are fused to the cathodes by evaporating the organic matter and melting the metal powder. The present invention can be adopted in any multi-electrode tube structure of a field emission array as well as a diode structure having an anode and a cathode and a triode structure having an anode, a cathode and a gate. According to the present invention, carbon nanotubes are fused to cathodes and substitute for microtips for emitting electrons. As an embodiment of the present invention, a triode field emission array will be described in detail with reference to FIGS. 3A and 3B.

Figure 3B:
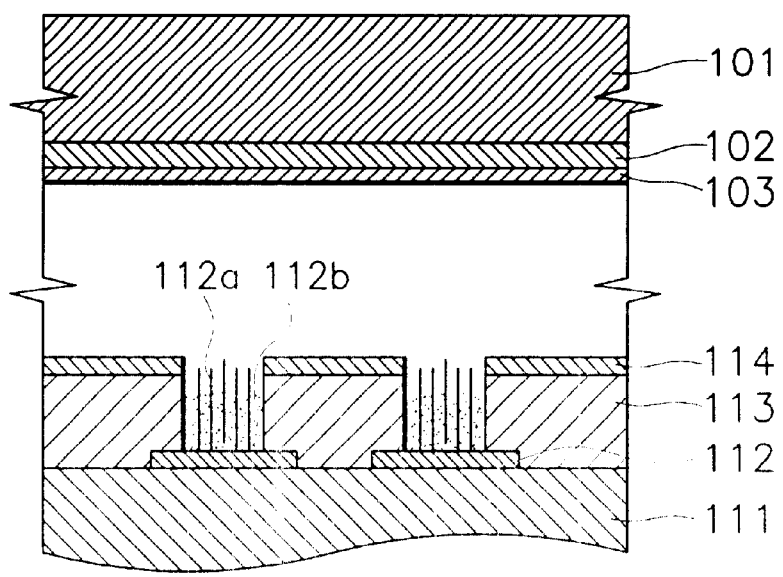
FIG. 3B is a sectional view of FIG. 3A taken along the line A–A'.

As shown in FIG. 3B, a field emission array using carbon nanotubes according to the present invention includes a front substrate 101 and a rear substrate 111 facing each other and anodes 102 and cathodes 112 which are formed on the front and rear substrates 101 and 111, respectively, in a striped pattern such that the anodes 102 cross the cathodes 112. Carbon nanotubes 112a are fused to the cathodes 112 using a metal fuser element 112b. An insulating layer 113 is provided on the rear surface 111 and the part of the cathodes 112 other than the part of the cathodes 112 to which the carbon nanotubes 112a are fused. Gates 114 are formed on the insulating layer 113 in a striped pattern. Each of the anodes 102 is formed of an ITO film, and the entire surface of each anode 102 is coated with phosphor 103.

Figure 4A:
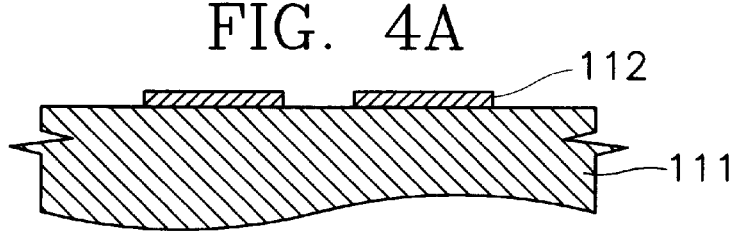
FIGS. 4A through 4D are sectional views illustrating the steps of a method of fabricating a field emission array using carbon nanotubes according to the present invention.
Figure 4B:
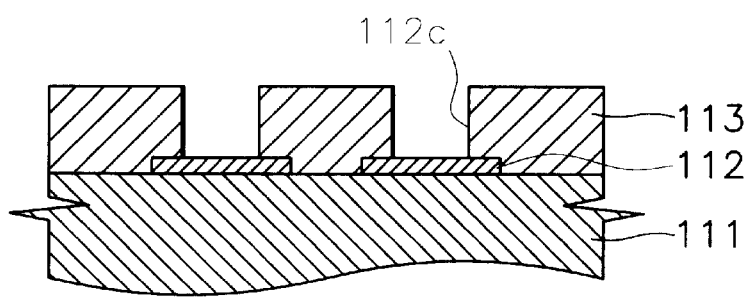
Figure 4C:
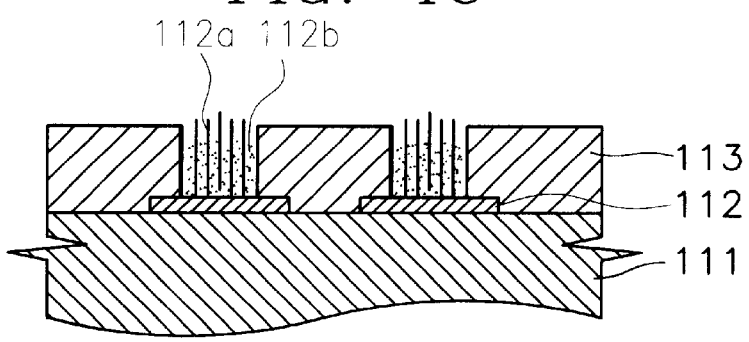
Figure 4D:
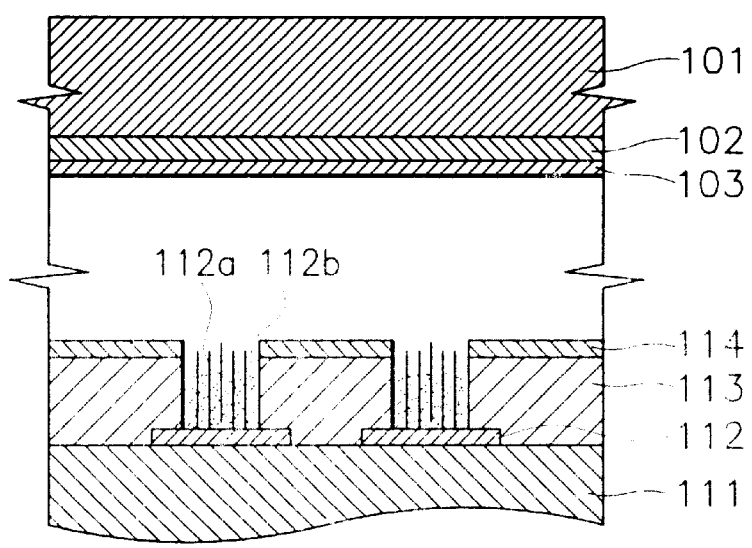

In fabricating a carbon nanotube field emission array having such structure, first, the cathodes 112 are formed on the rear substrate 111 in a striped pattern, as shown in FIG. 4A (referred to as step X). Next, as shown in FIG. 4B, the insulating layer 113 is formed on the exposed rear substrate 111 and the part of the cathodes 112 other than the part to which carbon nanotubes are fixed. Next, as shown in FIG. 4C, a mixture 112a and 112b of carbon nanotubes, metal powder and organic binder is printed on predetermined areas of the cathodes 112 through insulating layer opening portions 112c over the cathodes 112 (referred to as step Y). In the case of the diode, the insulating layer 113 may be formed, but does not need to be formed. Subsequently, as shown in FIG. 4D, the mixture 112a and 112b is sintered to evaporate the organic binder, and the metal powder is melted or diffused to adhere the carbon nanotubes 112a to the cathodes 112 (referred to as step Z). Thereafter, the front substrate 101, on which the anodes 102 are formed in a striped pattern, is combined with the rear substrate 111 having the cathodes 112, to which the carbon nanotubes 112a are fused, spaced apart by a predetermined distance, thereby completing the array.

In a method of fabricating such field emission device, the step Y of self-aligning carbon nanotubes is particularly difficult. To over this difficulty, the present invention proposes two methods of aligning carbon nanotubes. In a first method, as shown in FIG. 5 or FIGS. 6A through 6C, after diffusing carbon nanotubes, a mixture 120 of an organic binder and powder of a low-melting point metal such as aluminum, silver, zinc or copper is squeezed into holes 130a in a filter formed of glass such that the mixture 120 is injected into the holes 112c in the insulating layer 113, which are aligned with a predetermined pixel size. Thereafter, the organic binder is heated to be evaporated, and the metal powder is melted to fix the carbon nanotubes. In a second method, as shown in FIGS. 7A through 7E, after diffusing carbon nanotubes, a mixture of low-melting point metal powder and an organic binder is pressed on electrodes by a screen printing method using a metal mesh screen 160a which is patterned on a substrate of an insulating material, so that the carbon nanotubes can be aligned and fixed.

It is advantageous in printing to use metal powder in which the diameters of the particles are about 0.1–10 μm when making a mixture for adhering carbon nanotubes. When fabricating a multi-electrode tube other than a diode, an insulating layer is essential. To prevent damage on an insulating layer during sintering after printing of the mixture, metal must easily melt at low temperature. Accordingly, a low-melting point metal powder, which is melted at a lower temperature than a temperature at which the insulating layer is formed, should be used. Since the insulating layer is generally formed at about 450–570° C., it is preferable to use a metal which is diffused at 250–500° C. or melted at 100–350° C. for metal powder. Silver (Ag), aluminum (Al), nickel (Ni), copper (Cu) and zinc (Zn) can be used as the metal which is diffused at 250–500° C. Pb, In, InSn, PbSn and AuSn and metal alloys thereof can be used as the metal which is melted at 100–350° C. The diameter of each of the particles is 0.1–10 μm.

For an organic binder used in making a mixture for printing, α-terpineol, ethyl cellulose or butyl carbitol acetate may be used. In mixing, the mixture is completely mixed by grinding source materials.

Figure 5:
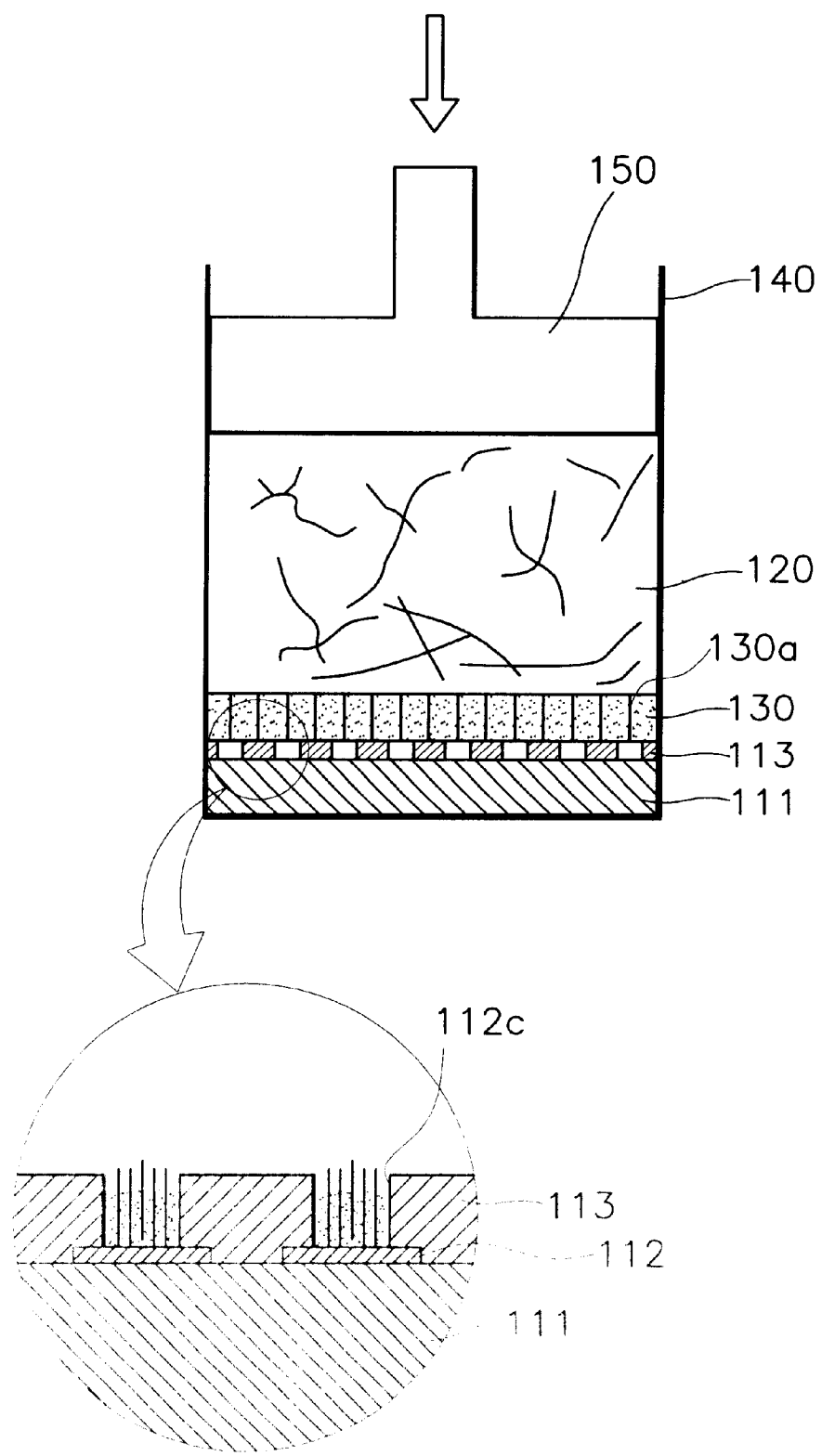
FIG. 5 is a sectional view of an apparatus which has a filter for alignment of carbon nanotubes and is used when a pressing method is used during the steps of FIGS. 4A through 4D.

When using an extrusion technique in the printing step Y in which the alignment of carbon nanotubes is determined, an apparatus with a filter 130 for alignment of carbon nanotubes, as shown in FIG. 5, is used. When a mixture 120 for printing is injected into a cylinder 140 with the filter 130 and firmly pressed with a piston 150, the mixture 120 passes through the holes 130a on the filter 130 and is applied to the cathodes 112 exposed by the opening portions 112c on the insulating layer 113 while vertically aligning carbon nanotubes contained in the mixture 120. In other words, a mixed paste is extruded through a ceramic (or glass) filter with holes of a pixel size, and thus aligned on cathodes. Thereafter, an organic binder is evaporated by heat treatment at low temperature (200–500° C.), and metal powder is sintered to fix carbon nanotubes in the holes of an insulating layer.

Figure 6A:
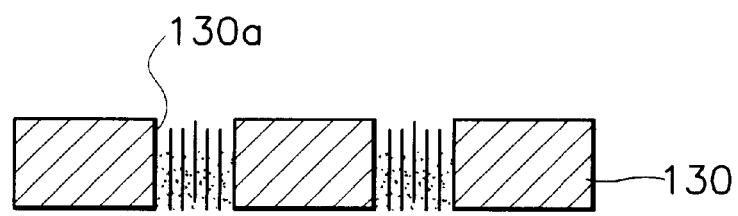
FIGS. 6A through 6C show pressing steps using a filter formed of ceramic (alumina) when an insulating layer is not formed in the case of FIG. 5.
Figure 6B:
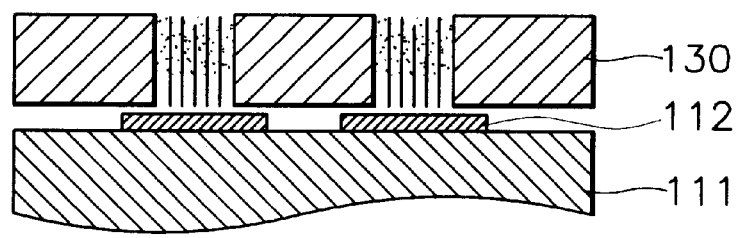
Figure 6C:
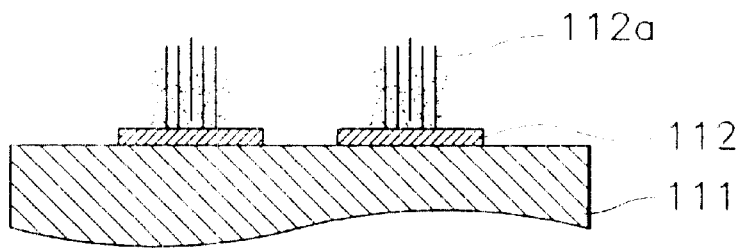

Unlike FIG. 5, FIGS. 6A through 6C show a process of pressing carbon nanotubes through a filter formed of ceramic (alumina) when an insulating layer is not formed. Carbon nanotubes, which are extruded through holes on the filter and aligned, are pressed on patterned metal films (cathodes) to be fixed. FIG. 6A shows a state in which a mixture for printing is injected into the holes 130a of the ceramic (alumina) filter 130. FIG. 6B shows a state in which the holes 130a of the filter 130 are aligned on the cathode 112 lines on the rear substrate 111 without an insulating layer. FIG. 6C shows a state in which carbon nanotubes 112a are adhered by printing the mixture on predetermined areas of the cathodes 112 through pressing and sintering.

Figure 7A:
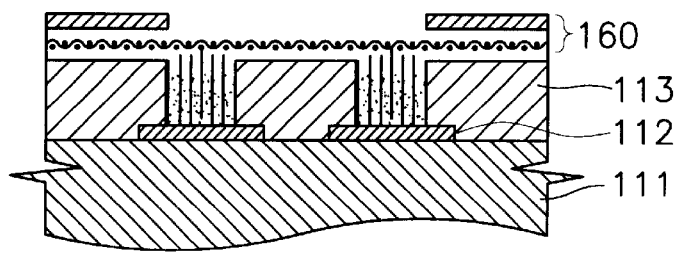
FIGS. 7A through 7E are plan and sectional views illustrating the structure of a screen printer in which a mask is combined with a mesh screen formed of stainless wires. during the steps of FIGS. 4A through 4D.
Figure 7B:
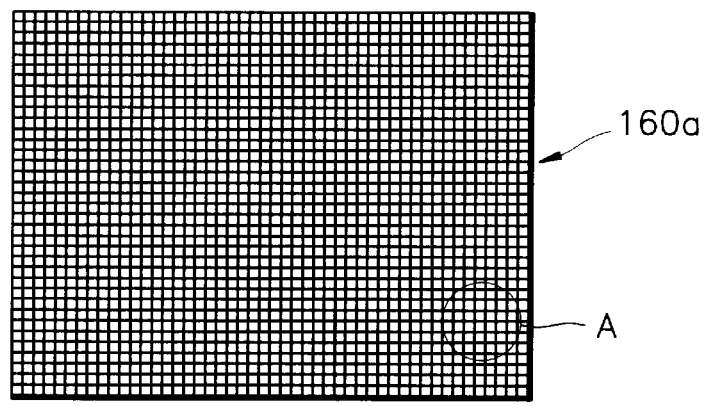
Figure 7C:
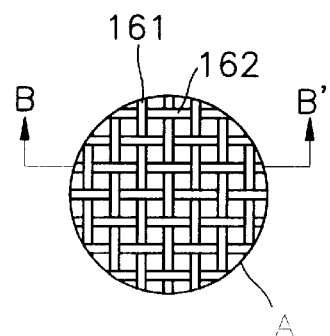
Figure 7D:
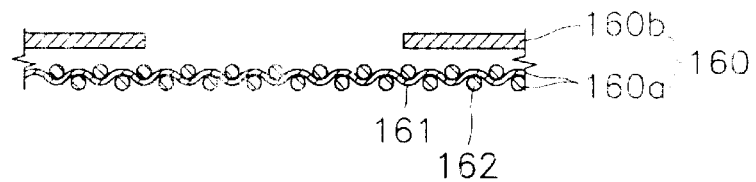
Figure 7E:
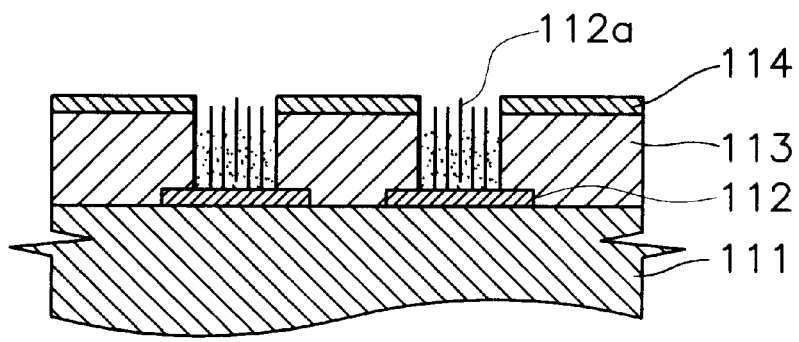
Figure 8A:
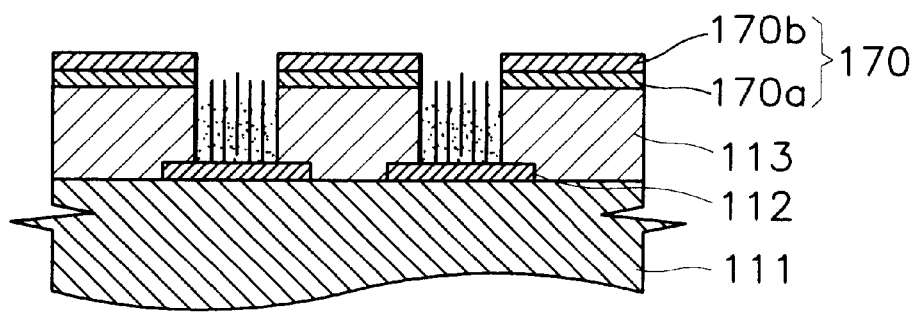
FIG. 8A is a sectional view of the whole rear substrate with a dual-layer gate plate, which is previously manufactured.
Figure 8B:
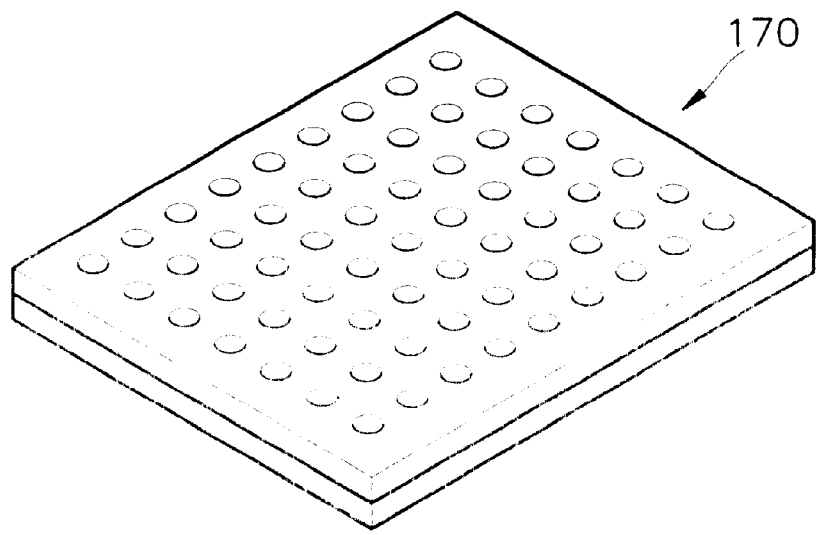
FIG. 8B is a perspective view of the whole gate plate of FIG. 8A.

When using a screen printing technique in the printing step Y in which the alignment of carbon nanotubes is determined, as shown in FIGS. 7A through 7E, a screen printer 160, in which a mesh screen 160a formed of stainless steel wires is combined with a mask 160b, is used. More specifically, as shown in FIG. 7A, after laying the screen printer 160 on the rear substrate 111 having the cathodes 112, a roller (not shown) to which a mixture for printing is applied is rolled on the screen printer 160. Then, the mixture on the roller sequentially passes through the mask 160b and the screen 160a of the screen printer 160 and is applied to the top of each of the cathodes 112 through the holes of the insulating layer 113 on the rear substrate 111. Since the mixture passes through the mesh screen 160a in printing, carbon nanotubes contained in the mixture are vertically aligned on the cathodes 112. FIG. 7B is a plan view of the mesh screen 160a woven with stainless steel wires in the screen printer 160. FIG. 7C is an enlarged view of the mesh structure of part A of FIG. 7B. FIG. 7D is a sectional view of FIG. 7C taken along the line B–B'. Referring to FIG. 7D, the screen printer 160 includes the screen which is made by weaving a mesh comprising warp threads 161 and weft threads 162 and the mask 160b for making the mixture injected only into predetermined areas. FIG. 7E shows the structure of the completed rear substrate 111, on which the carbon nanotubes 112a are fused to the cathodes 112 by melted metal powder and gates 114 are formed on the insulating layer 113, after finishing the printing of the mixture by the screen printing scheme. The gates 114 are formed by depositing a metal on the $SiO_2$ insulating layer 113 and patterning the deposited metal using a photolithography method. Alternatively, after screen printing and firing has been completed, a gate plate 170 which is prepared in advance, as shown in FIG. 8A, may be bonded onto the insulating layer 113 to complete a device. FIG. 8B is a perspective view illustrating the whole appearance of the gate plate 170. The gate plate 170 is formed by depositing a gate 170b formed of a conductor on a substrate 170a formed of an insulating material.

It is preferable to perform the sintering at a temperature of 200–500° C. in the heat treatment process of the step Z.

Figure 9:
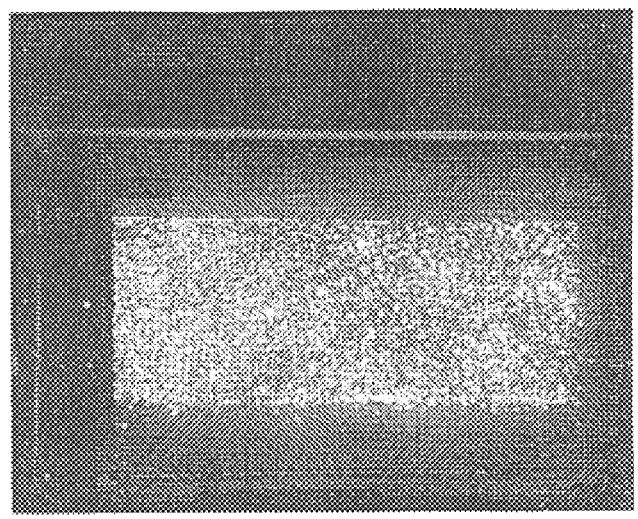
FIG. 9 is a photograph (40×80 mm) showing the electron emission characteristic of carbon nanotubes which are fabricated by screen printing.
Figure 10:
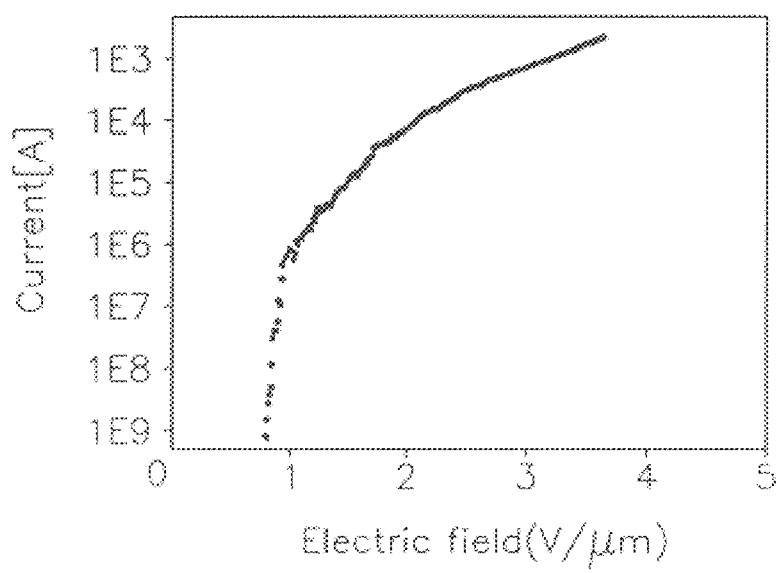
FIG. 10 is a current-electric field graph showing the electron emission characteristic of a field emission array using carbon nanotubes according to the present invention.
Figure 11:
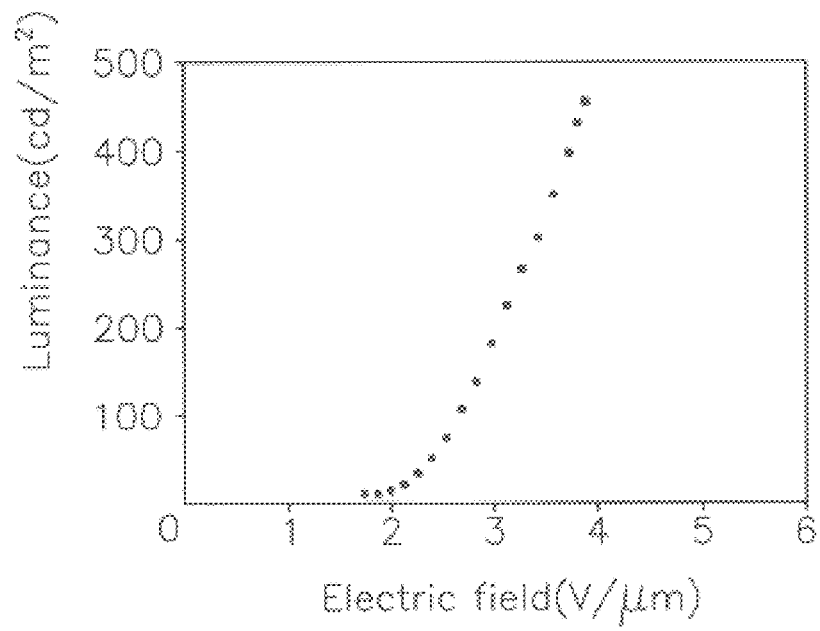
FIG. 11 is a luminance-electric field graph showing the electron emission luminance characteristic of a field emission array using carbon nanotubes according to the present invention.
Figure 12:
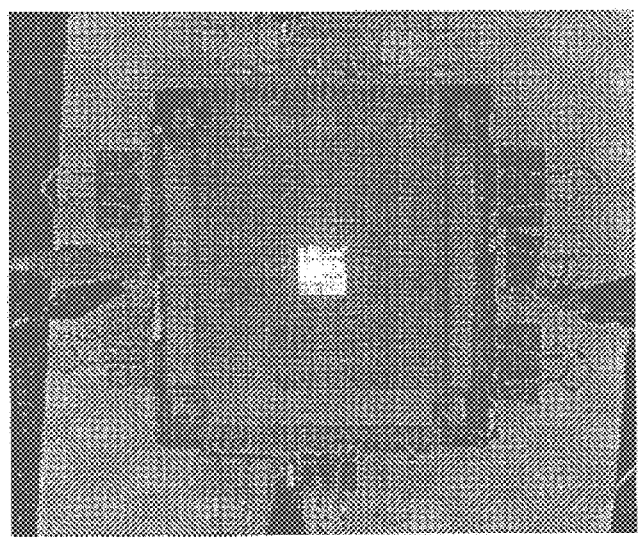
FIG. 12 is a photograph showing the electron emission of a field emission array using carbon nanotubes according to the present invention.

The functions of carbon nanotubes in such field emission array are shown through FIGS. 9 through 12. FIG. 9 is a photograph (40×80 mm) showing the electron emission characteristic of carbon nanotubes which are fabricated by screen printing. FIG. 10 is a current-electric field graph showing the electron emission characteristic of the carbon nanotubes. FIG. 11 is a luminance-electric field graph showing the electron emission luminance characteristic of the carbon nanotubes. FIG. 12 is a photograph showing the electron emission of the carbon nanotubes.

After finishing the fabrication of the rear substrate, the front substrate is coated with phosphor in such a manner that each anode of a pixel size is coated with red, green or blue phosphor. Thereafter, the front and rear substrates are packaged in vacuum to constitute a display.

A cathode structure to which carbon nanotubes are fused according to the present invention can be used as a cathode for super high frequency microwave.

As described above, a field emission array according to the present invention uses carbon nanotubes as electron emission sources, thereby lowering a work function and dropping driving voltage. Consequently, the present invention allows a device to be driven at low voltage. In addition, the present invention improves resistance to gases, which are generated during the operation of a device, thereby increasing the lifetime of an emitter, and substantially discharging heat, which is generated during the operation, thereby making epoch-making improvement in the performance of the field emitter. Moreover, the present invention allows emission of high density electrons by using an extremely microscopic electron emission source.

Consequently, the present invention can be widely adopted, for example, in high frequency electron oscillators and displays driven at low voltage, as a next generation high density electron emission source.

Furthermore, the present invention uses room temperature deposition and low temperature heat treatment for fabricating an electron emission source emitter of carbon nanotubes, and uses screen printer as a fabricating apparatus, thereby simplifying the fabrication process.

What is claimed is:

1. A method of fabricating a field emission array using carbon nanotubes, the method comprising the steps of:
   (a) forming cathodes on a rear substrate in a striped pattern;
   (b) printing a mixture of carbon nanotubes, metal powder and organic binder on predetermined areas of the cathodes;
   (c) vaporizing the organic binder by sintering the mixture and anchoring the carbon nanotubes on the cathodes by diffusing the metal powder;
   (d) combining a front substrate, on which anodes are formed in a striped pattern, with the rear substrate having the cathodes on which the carbon nanotubes are anchored;
   forming an insulating layer on the tops of the cathodes other than portions to which the carbon nanotubes are to be adhered and on the top of the rear substrate where the cathodes are not formed, before the step (b); and
   forming gates on the insulating layer after the step (c).

2. The method of claim 1, wherein in the step (b), the metal powder is composed of metal particles having a diameter of 0.1–10 $\mu$m.

3. The method of claim 1, wherein in the step (b), the metal powder is diffused at a temperature of 250–500° C.

4. The method of claim 1, wherein in the step (b), the metal powder is melted at a low temperature of 100–350° C., and in the step (c), the mixture is sintered to evaporate the organic binder, and the low melting point metal powder is melted to anchor the carbon nanotubes on the cathodes.

5. The method of claim 1, wherein in the step (b), the organic binder is composed of at least one selected from the group consisting of α-terpineol, ethyl cellulose and butyl carbitol acetate.

6. The method of claim 1, wherein in the step (b), the printing is performed by an extrusion method using a filter for aligning the carbon nanotubes.

7. The method of claim 1, wherein in the step (b), the printing is performed by a screen printing method using a metal mesh screen which is patterned for aligning the carbon nanotubes.

8. The method of claim 1, wherein in the step (c), the sintering is performed at a temperature of 200–500° C.

9. The method of claim 1, wherein the metal powder is composed of particles of a metal selected from the group consisting of Ag, Al, Ni, Cu and Zn.

10. The method of claim 1, wherein the metal powder is composed of particles of a metal selected from the group consisting of Pb, In, InSn, PbSn, AuSn and a metal alloy thereof, and the diameter of each of the particles is 0.1–10 $\mu$m.

11. A method of fabricating a field emission array using carbon nanotubes, the method comprising the steps of:
   (a) forming cathodes on a rear substrate in a striped pattern;
   (b) printing a mixture of carbon nanotubes, metal powder and organic binder on predetermined areas of the cathodes;
   (c) vaporizing the organic binder by sintering the mixture and anchoring the carbon nanotubes on the cathodes by diffusing the metal powder;
   (d) combining a front substrate, on which anodes are formed in a striped pattern, with the rear substrate having the cathodes on which the carbon nanotubes are anchored;
   wherein in the step (b), the printing is performed by an extrusion method using a filter for aligning the carbon nanotubes.

12. The method of claim 11, wherein in the step (b), the metal powder is composed of metal particles having a diameter of 0.1–10 $\mu$m.

13. The method of claim 11, wherein in the step (b), the metal powder is diffused at a temperature of 250–500° C.

14. The method of claim 13, wherein the metal powder is composed of particles of a metal selected from the group consisting of Ag, Al, Ni, Cu and Zn.

15. The method of claim 11, wherein in the step (b), the metal powder is melted at a low temperature of 100–350° C., and in the step (c), the mixture is sintered to evaporate the organic binder, and the low melting point metal powder is melted to anchor the carbon nanotubes on the cathodes.

16. The method of claim 15, wherein the metal powder is composed of particles of a metal selected from the group consisting of Pb, In, InSn, PbSn, AuSn and a metal alloy thereof, and the diameter of each of the particles is 0.1–10 $\mu$m.

17. The method of claim 11, wherein in the step (b), the organic binder is composed of at least one selected from the group consisting of α-terpineol, ethyl cellulose and butyl carbitol acetate.

18. The method of claim 11, wherein in the step (c), the sintering is performed at a temperature of 200–500° C.

* * * * *